(12) United States Patent
Zhang et al.

(10) Patent No.: US 9,626,253 B1
(45) Date of Patent: Apr. 18, 2017

(54) AUTONOMOUS CONTAINER GROUP MANAGEMENT FOR SCALE OUT DEDUPLICATION SYSTEM

(71) Applicant: Symantec Corporation, Mountain View, CA (US)

(72) Inventors: Xianbo Zhang, Roseville, MN (US); Haibin She, Beijing (CN); Haigang Wang, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 282 days.

(21) Appl. No.: 14/316,636

(22) Filed: Jun. 26, 2014

(51) Int. Cl.
*G06F 17/30* (2006.01)
*G06F 11/14* (2006.01)

(52) U.S. Cl.
CPC ............... *G06F 11/1458* (2013.01)

(58) Field of Classification Search
CPC .............. G06F 17/30082; G06F 17/30008
See application file for complete search history.

(56) References Cited

U.S. PATENT DOCUMENTS

| | | | | |
|---|---|---|---|---|
| 2010/0274765 | A1* | 10/2010 | Murphy | G06F 11/1451 707/652 |
| 2013/0173553 | A1* | 7/2013 | Apte | G06F 7/00 707/640 |
| 2014/0101113 | A1* | 4/2014 | Zhang | G06F 11/1453 707/692 |
| 2015/0205818 | A1* | 7/2015 | Darcy | G06F 17/30194 707/822 |

\* cited by examiner

*Primary Examiner* — Etienne Leroux
*Assistant Examiner* — Cindy Nguyen
(74) *Attorney, Agent, or Firm* — Womble Carlyle Sandridge & Rice LLP

(57) ABSTRACT

A method for data container group management in a deduplication system is provided. The method includes arranging a plurality of data container groups according to a plurality of file systems. A subset of the plurality of data container groups correspond to each of the plurality of file systems, each of the plurality of data container groups having a reference database, a plurality of data containers, and a data container group identifier (ID). The method includes performing a first backup process for a first client-policy pair with deduplication via a first one of the plurality of data container groups and performing a second backup process for a second client-policy pair with deduplication via a second one of the plurality of data container groups.

19 Claims, 6 Drawing Sheets

AUTONOMOUS CONTAINER GROUP MANAGEMENT FOR SCALE OUT DEDUPLICATION SYSTEM

BACKGROUND

Deduplication systems perform backup processes for amounts of data that are continually growing in the information age. Storage capacity requirements for deduplication systems are increasing at a rapid rate. Yet, achieving scalable storage management remains a challenge, especially as deduplication systems approach and surpass the petabyte (PB) level. File systems, such as Veritas File System (VxFS) and XFS may only efficiently manage a limited amount of disk or other storage space. Load balancing also becomes problematic with large amounts of data. The efficiency of data writes and reference updates may decrease with large amounts of data and many clients sending data under different policies to a deduplication system. It is within this context that the embodiments arise.

SUMMARY

In some embodiments, a method for data container group management in a deduplication system is provided. The method includes arranging a plurality of data container groups according to a plurality of file systems. A subset of the plurality of data container groups correspond to each of the plurality of file systems, each of the plurality of data container groups having a reference database, a plurality of data containers, and a data container group identifier (ID). The method includes performing a first backup process for a first client-policy pair with deduplication via a first one of the plurality of data container groups and performing a second backup process for a second client-policy pair with deduplication via a second one of the plurality of data container groups, wherein at least one method operation is performed by a processor.

In some embodiments, a tangible, non-transitory, computer-readable media having instructions thereupon which, when executed by a processor, cause the processor to perform actions is provided. The actions include performing a first backup process for a first client-policy pair with deduplication via a first one of a plurality of data container groups, wherein the first one of the plurality of data container groups is in a first subdirectory that is named with a first data container group identifier (ID) and is under a first file system. The actions include performing a second backup process for a second client-policy pair with deduplication via a second one of a plurality of data container groups, wherein the second one of the plurality of data container groups is in a second subdirectory that is named with a second data container group ID and is under a second file system.

In some embodiments, a deduplication system with autonomous data container group management is provided. The system includes a plurality of data container groups organized under a plurality of file systems, each of the plurality of data container groups having a plurality of data containers configured to hold data from deduplication, a reference database configured to track references of each of the plurality of data containers, and a data container group identifier (ID) as a name of a subdirectory under one of the plurality of file systems. The system includes at least one processor, configured to perform actions. The actions include performing backup processes for differing client-policy pairs via differing ones of the plurality of data container groups under differing ones of the plurality of file systems and generating a data container group location map based on the name of the subdirectory of each of the plurality of data container groups, wherein the backup processes are as mapped by the data container group location map.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Autonomous management of data container groups applicable to a deduplication system is described herein. Generally, a deduplication system performs backups of data from client-policy pairs, storing portions of data (e.g., data segments) in data containers. Portions of data that are found to match fingerprints of data portions already stored in the data containers are discarded, thus improving storage efficiency. References of each backup image to data portions stored in the data containers are tracked by the deduplication system. Through the autonomous management of data container groups, the embodiments manage storage capacity for large deduplication systems. Storage space is managed as data container groups. Each data container group has an identifier (ID) and corresponding container reference database. Each data container group ID is globally unique within a particular system. Data location information is managed at the container group level for data segment writes and reads, with scalability to the petabyte level and beyond. Multiple file systems are used to overcome the limitation of space that each file system may have. Present embodiments provide efficient load-balancing, including I/O (input/output) and space usage, among file systems, and further provide efficient data writes and reference updates during deduplication.

Data container groups can be moved for usage balancing so that file system space usage is load balanced at the container group level in some embodiments. The size of a data container location map can be controlled by increasing the size of one or more of the data container groups, so that the map size does not limit the system capacity. In some embodiments, a data container location map can be maintained in memory (e.g., volatile random-access memory or RAM), and may not need to be persisted.

Figure 1:
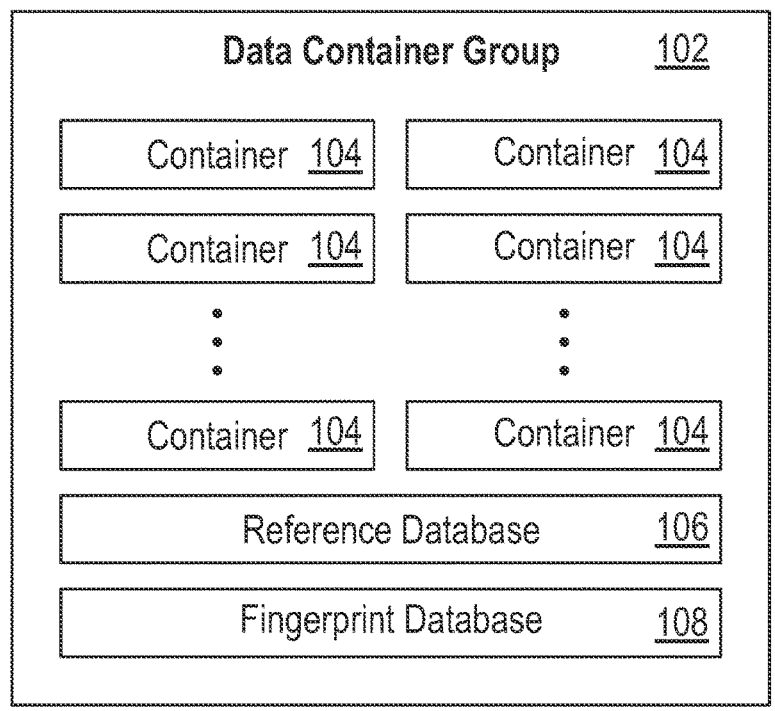
FIG. 1 illustrates a data container group, in accordance with an embodiment of the present disclosure.

FIG. 1 illustrates a data container group 102, in accordance with embodiments of the present disclosure. The data container group 102 has a data container group ID, such as a number, letter, name or symbol, and includes a set of data containers 104 and a reference database 106 specific to the data containers 104 in the data container group 102. The reference database 106 (e.g., a database file) manages references to data containers 104 in the data container group 102. These references are created by backup images during deduplication. The references of a data container 104, as written to the reference database 106, inform the deduplication system which backup image is referencing data segments in a particular data container 104. Container space can be reclaimed if the references of the data container 104 become zero. In some embodiments, a fingerprint database 108 (as applied for discarding matched data segments during deduplication) is separate from the reference database 106 in the data container group 102. In some embodiments, the fingerprint database 108 is included in the reference database 106. In some embodiments, file sytems which are used for the fingerprint database 108 and the reference database 106 are different than file systems are used to store container 104.

Still referring to FIG. 1, each data container group 102 is preallocated for data from one or more client-policy pairs. In some embodiments, each data container group 102 has a fixed (predetermined) number of data containers 104. Data from different client-policy pairs can be written into different data container groups 102 that are allocated to different file systems and/or volume groups. That is, while data from differing client-policy pairs may be written into one data container group 102, it may be more efficient to write data from differing client-policy pairs into differing data container groups 102, and the system can do so. The latter practice supports paralleled reference updating and data storing for individual backup processes performed in parallel.

Figure 2:
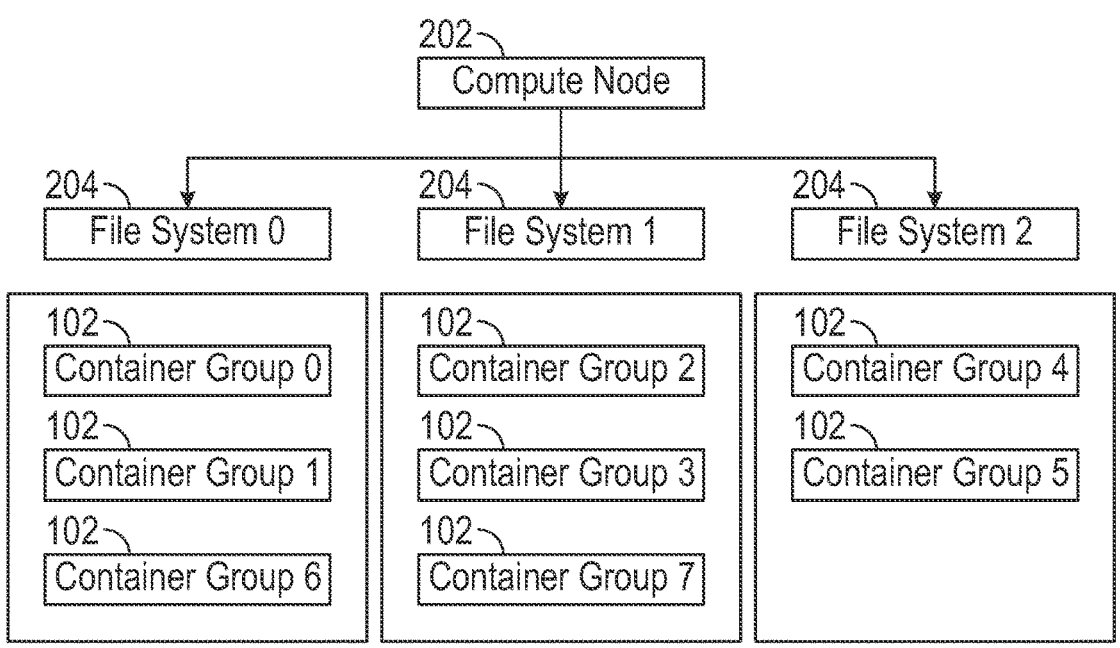
FIG. 2 illustrates an arrangement of data container groups under file systems, as mapped via a compute node in accordance with some embodiments.

FIG. 2 illustrates an arrangement of data container groups 102 under file systems 204, as mapped via a compute node 202 in an embodiment. In this example, data container group 102 "0", data container group 102 "1" and data container group 102 "6" are under file system 204 "0". Data container group 102 "2", data container group 102 "3" and data container group 102 "7" are under file system 204 "1". Data container group 102 "4" and data container group 102 "5" are under file system 204 "2". The file system 204 "0", file system 204 "1" and file system 204 "2" are under the compute node 202. The file systems 204 can be differing file systems 204, differing versions of a file system 204, differing instantiations of the same file system 204, or combinations thereof. In various embodiments, the compute node 202 is a type of system node and could include a switch or other circuitry or device that routes data segments to an appropriate one of the file systems 204 and to an appropriate data container group 102, according to the client-policy pair from which the data originates. In order to do so, the compute node 202 maintains, provides access to, or enables generation of a data container group location map.

An example of a data container group location map suitable for the compute node 202 is provided in TABLE 1.

TABLE 1

| Container Group ID | File system ID | Data Source (Client and policy) |
|---|---|---|
| 0 | 0 | Client0, policy0 |
| 1 | 0 | Client0, policy0 |
| 2 | 1 | Client0, policy1 |
| 3 | 1 | Client0, policy1 |
| 4 | 2 | Client1, policy0 |
| 5 | 2 | Client1, policy0 |
| 6 | 0 | Client2, policy0 |
| 7 | 1 | Client2, policy0 |

This data container group location map directs data, e.g., data segments obtained during deduplication, to a particular file system ID and a particular container group ID, according to the client and policy of the data source (i.e., according to the client-policy pair associated with the data). A processor, such as a processor of a deduplication system can generate the data container group location map, and store the data container group location map in the compute node 202 or in a memory to which the compute node 202 has access. For example, the compute node 202 could have mount point information relating to each of the file systems 204. A processor could scan the mount points, and mount the file systems 204 associated with the compute node 202. Mounting the file systems 204 makes the directories, files, etc. of the file systems 204 available to the processor. The processor could then read the subdirectories under each of the file systems 204.

Still referring to FIG. 2 and TABLE 1, in this and further embodiments, each data container group 102 is in a subdirectory that is named with the container group ID, under one of the file systems 204. Thus, for example, data container group 102 "0" is in a subdirectory under file system 204 "0", and this subdirectory is named "container group 0", which is the container group ID. Various further naming conventions and examples are readily devised. The processor reads the subdirectories and determines which data container groups 102 are under which file systems 204, and then generates a data container group location map. The data container group location map can thus be populated with the correspondence between data container groups 102 and file systems 204. Once the data container groups 102 are located, the processor can determine which client-policy pairs correspond to which data container groups 102 (either read from reference database, read from container 104, or other methods). This information can be placed into the data container group location map, as shown in the table above. The data container group location map does not need to be maintained in non-volatile memory, and could be maintained in volatile memory such as RAM. In some embodiments, the data container group location map is generated on startup or reboot of the system, and updated during system operation.

Figure 3:
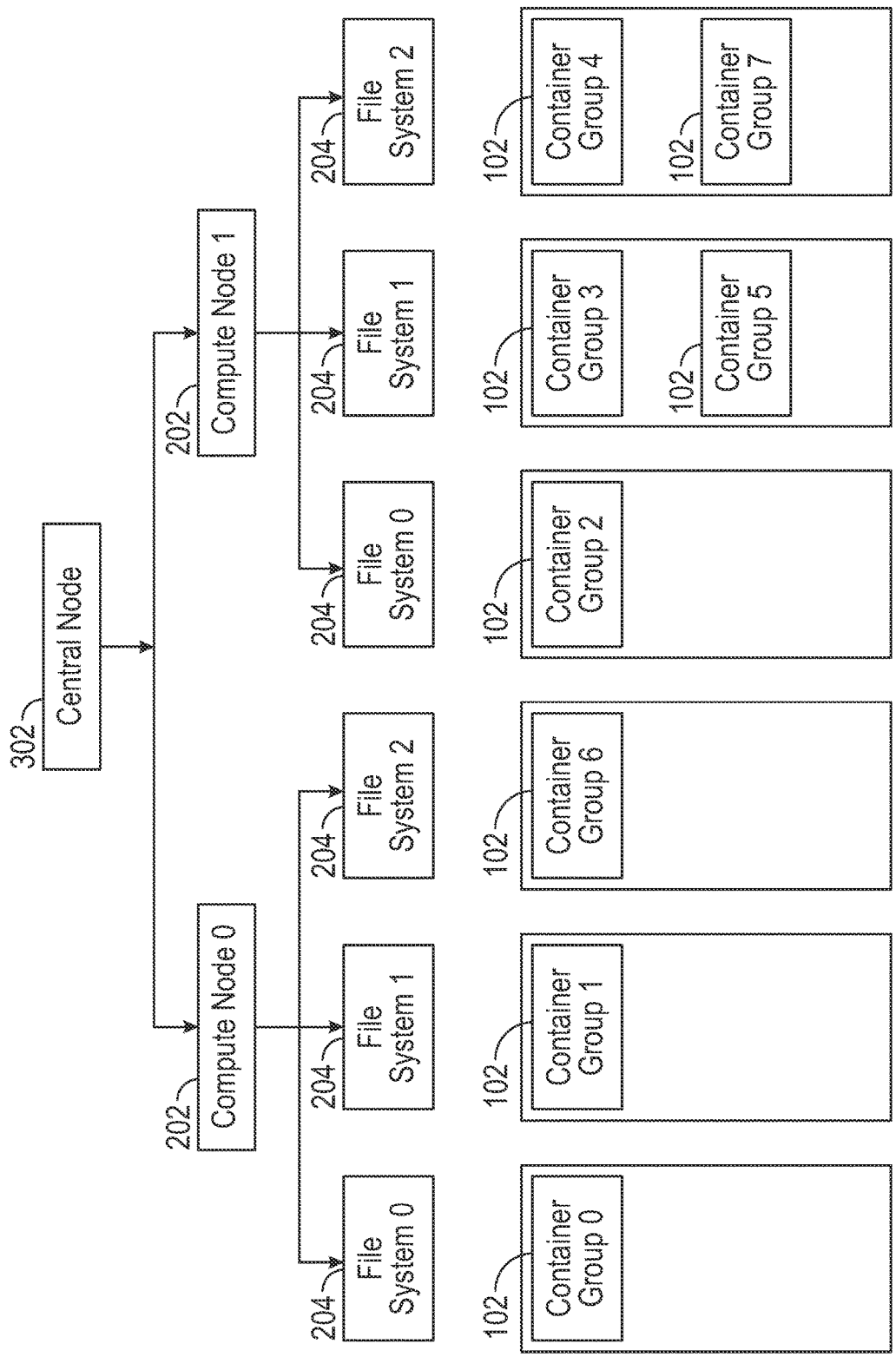
FIG. 3 illustrates a further arrangement of data container groups under file systems, as mapped via a central node in accordance with some embodiments.

FIG. 3 illustrates a further arrangement of data container groups 102 under file systems 204, as mapped via a central node 302 in an embodiment. This arrangement is related to the arrangement of data container groups 102 depicted in FIG. 2, and has an additional level in a hierarchical structure beyond that of the arrangement of FIG. 2. Two or more of the compute nodes 202 of FIG. 2 are arranged under a central node 302. Each of the compute nodes 202 has one or more file systems 204 in some embodiments. One or more data container groups 102 are organized under each of the file systems 204. In the example shown in FIG. 3, the data container group 102 "0" is under the file system 204 "0", which is under the compute node 202 "0". The data container group 102 "1" is under the file system 204 "1", which is under the compute node 202 "0". The data container group 102 "6" is under the file system 204 "2", which is under the compute node 202 "0". Compute node 202 "1" has further versions of some or all of the file systems 204 that are under the compute node 202 "0", and further data container groups 102 thereunder. Data container group 102 "2" is under the file system 204 "0", which is under the compute node 202 "1". Data container group 102 "3" and data container group 102 "5" are under the file system 204 "1", which is under the compute node 202 "1". Data container group 102 "4" and data container group 102 "7" are under the file system 204 "2", which is under the compute node 202 "1". The central node 302 and each of the compute nodes 202, in various embodiments, are types of system nodes, and could include switches or other circuitry or devices that route data segments to an appropriate one of the file systems 204 and to an appropriate data container group 102, according to the client-policy pair from which the data originates. In order to do so, the central node 302 maintains, provides access to, or enables generation of a data container group location map. In some embodiments, file system 204 has a unique ID within the system.

An example of a data container group location map suitable for the central node 302 is provided in TABLE 2.

TABLE 2

| Container Group ID | Compute Node ID | Data Source (Client and policy) |
|---|---|---|
| 0 | 0 | Client0, policy0 |
| 1 | 0 | Client0, policy0 |
| 2 | 1 | Client0, policy1 |
| 3 | 1 | Client0, policy1 |
| 4 | 1 | Client1, policy0 |
| 5 | 1 | Client1, policy0 |
| 6 | 0 | Client2, policy0 |
| 7 | 1 | Client2, policy0 |

The data container group location map of TABLE 2 directs data, e.g., data segments obtained during deduplication, to a particular compute node ID and a particular container group ID, according to the client and policy of the data source (i.e., according to the client-policy pair associated with the data). A processor, such as a processor of a deduplication system, can generate the data container group location map, and store the data container group location map in the central node 302 or in a memory to which the central node 302 has access.

Each of the compute nodes 202 (e.g., compute node 202 "0" and compute node 202 "1") could have mount point information relating to each of the file systems 204 thereunder, as described above with reference to FIG. 2. An example of a data container group location map suitable for the compute node 202 "0" is provided in TABLE 3.

TABLE 3

| Container Group ID | File system ID | Data Source (Client and policy) |
|---|---|---|
| 0 | 0 | Client0, policy0 |
| 1 | 1 | Client0, policy0 |
| 6 | 2 | Client2, policy0 |

A processor, such as a processor of a deduplication system, can generate the data container group location map local to the compute node 202 "0" as shown above, in a similar manner as described previously with reference to FIG. 2. An example of a data container group location map suitable for the compute node 202 "1" is provided in TABLE 4.

TABLE 4

| Container Group ID | File system ID | Data Source (Client and policy) |
|---|---|---|
| 2 | 0 | Client0, policy1 |
| 3 | 1 | Client0, policy1 |
| 4 | 2 | Client1, policy0 |
| 5 | 1 | Client1, policy0 |
| 7 | 2 | Client2, policy0 |

A processor could likewise generate the data container group location map local to the compute node 202 "1" as shown above. In order to generate these data container group location maps, for the central node 302 and the compute nodes 202, a processor could access the central node 302 and access information therein leading to each of the compute nodes 202. Such information could include switch information, path information or mount point information. Then, the processor could access the mount point information at each of the compute nodes 202, mount the file systems 204 under each of the compute nodes 202, and proceed as outlined above with reference to FIG. 2. All of this information could then be used to populate the data container group location maps as shown above. Various formats for representing this information in memory are readily devised in accordance with the teachings herein.

Figure 4:
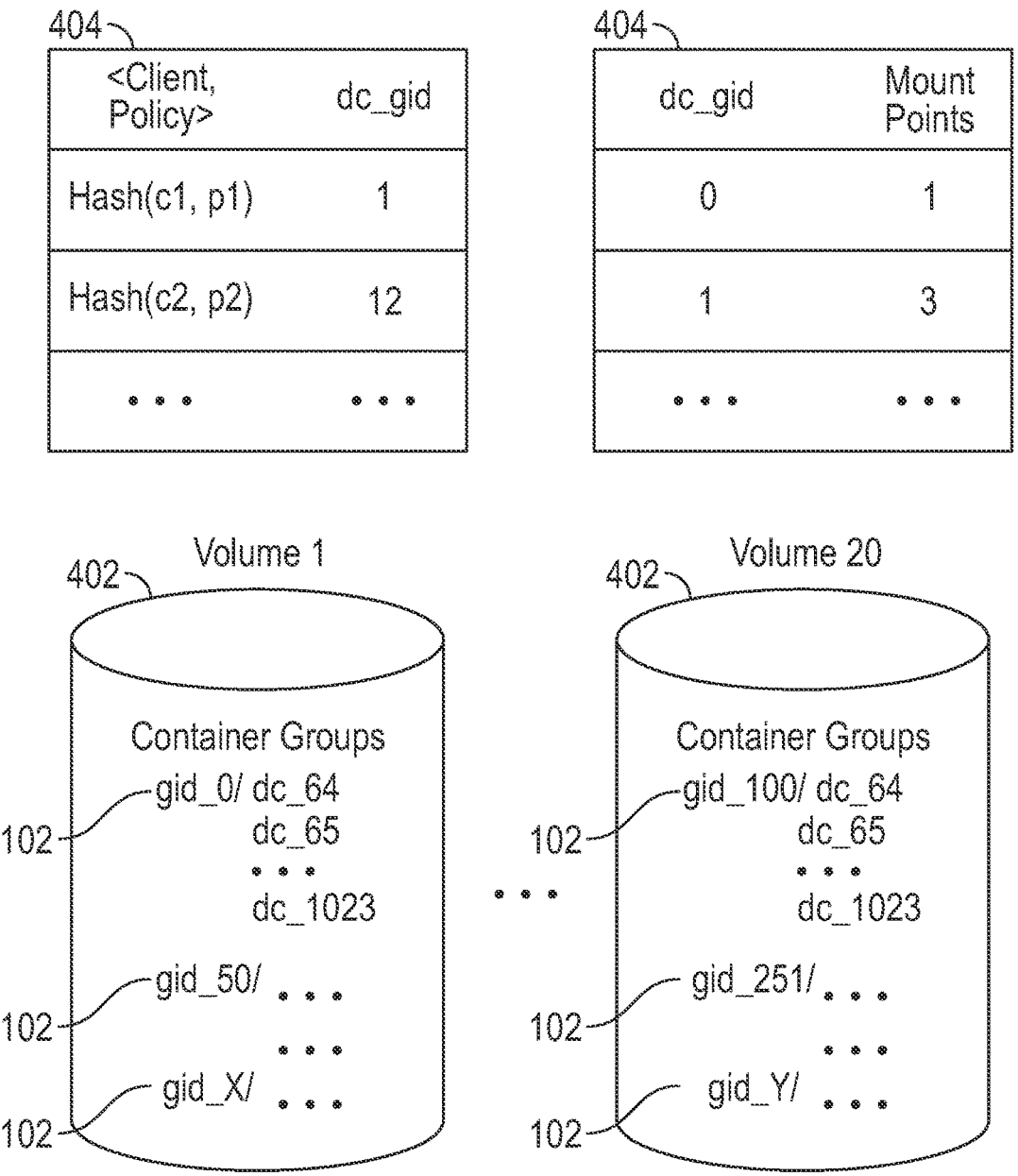
FIG. 4 shows data container groups arranged in volumes, with mapping tables in accordance with some embodiments.

FIG. 4 shows data container groups 102 arranged in volumes 402, with mapping tables 404. Each data container group has a data container group ID, such as "gid 0", "gid 50", etc. One of the mapping tables 404 maps client-policy pairs to data container group IDs. In the embodiment shown, the mapping is through a hash calculation using the client and the policy of a client-policy pair as inputs to the hash function. For example, each line of this mapping table 404 has the result of a hash calculation from a client-policy pair and the data container group ID corresponding to the client-policy pair. Another one of the mapping tables 404 maps data container group ID to a mount point. For example, each line of this mapping table 404 has a data container group ID and a corresponding mount point number or identifier. In some embodiments, each volume has a mountable file system. The file system is mounted, for example by a processor, by accessing the mount point information. Once the file system is mounted, the processor has access to the data container groups 102 in the volume 402. The embodiment of data container groups 102 arranged in volumes 402, with each volume having a mountable file system, can be employed in the embodiments shown in FIGS. 2 and 3 with data container groups 102 under the file systems 204. In these embodiments, the compute node 202 (see FIGS. 2 and 3) has the mount point information, and a processor can generate the mapping tables 404 by mounting the file systems, accessing the subdirectories, reading the data container group IDs (as the filenames of the subdirectories), and accessing the reference databases 106 in the data container groups 102 (see FIG. 1).

With reference back to FIGS. 1-4, in various embodiments and variations thereof a processor generates one or more of the various data container group location maps during system startup time. The location map information can be maintained in volatile or non-volatile memory. When a new data container group 102 is added or allocated, a map record is added. However, the deduplication system can accurately generate the one or more data container group location maps if the system crashes or otherwise is rebooted, since the new data container group 102 is added or allocated with a subdirectory named with the container group ID consistently with the description above. When a data container group 102 is removed, one map record is removed. The subdirectory with the container group ID of the data container group 102 that is removed should be deleted. Again, the deduplication system can accurately generate the one or more data container group location maps upon startup or reboot.

When a data container group 102 is moved, for example from under one file system 204 to another file system 204, or from under one compute node 202 to another compute node 202, the deduplication system updates the map records, and can accurately generate the one or more data container group location maps upon startup or reboot. In order to move a data container group 102, the processor creates a subdirectory under the destination file system 204 and names the subdirectory with the data container group ID. Data is read from the origin data container group 102, under whichever file system 204 the origin data container group 102 resides, and the data is then written to the data container group 102 under the destination file system 204. That is, the data is written to the subdirectory that has the data container group ID under the destination file system 204. After all data is transferred from the origin data container group 102 to the destination data container group 102, the subdirectory having the data container group ID under the origin file system 204 may be deleted, completing the move of the data container group 102. This mechanism supports accurate generation of the one or more data container group location maps. The destination file system 204 could be under the same compute node 202 as the origin file system 204, or could be under a differing compute node 202. The decision as to where to locate the destination for the data container group 102 being moved can be based on load balancing or usage balancing considerations. Container group movement may be needed or applied when a deduplication storage is resizing with either file system addition or deletion.

Figure 5:
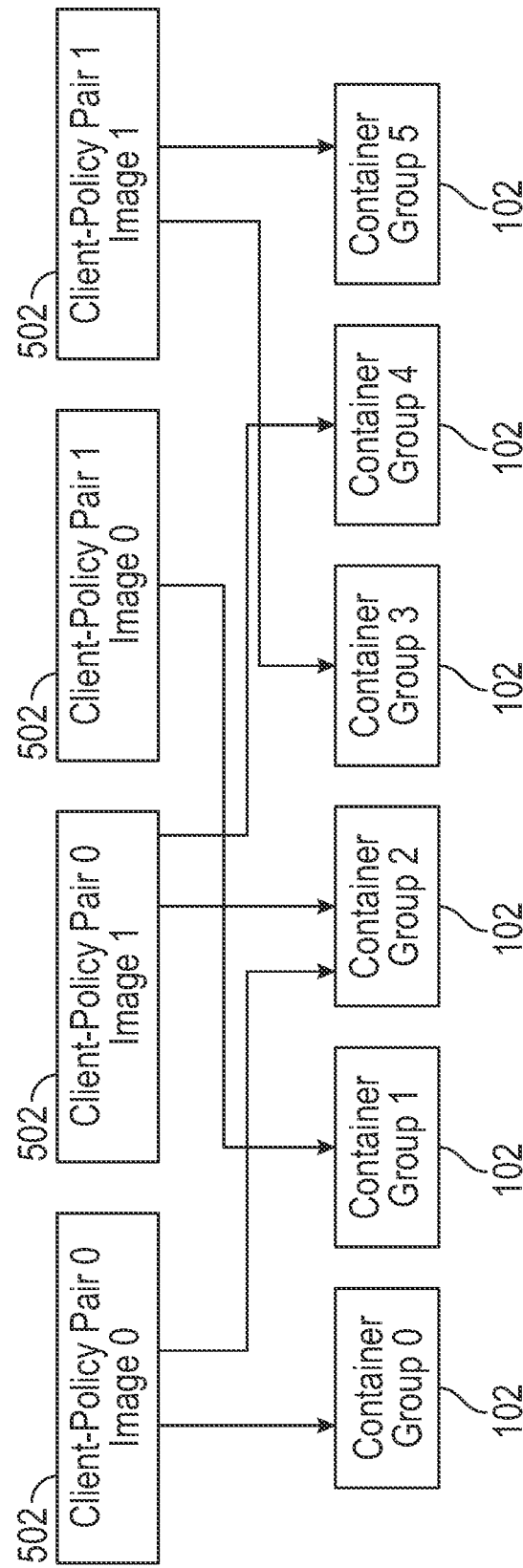
FIG. 5 shows data storing and reference updating performed in parallel during backup jobs from various client-policy pairs, with deduplication via various data container groups in accordance with some embodiments.

FIG. 5 shows data storing and reference updating performed in parallel during backup processes from various client-policy pairs, with deduplication via various data container groups 102. In this example, deduplication can be applied to the backup process using embodiments with autonomous data container group management as shown in FIGS. 1-4. Various images 502 are created during the backup processes, and use deduplication via various data container groups 102 in various ways. For example, image 502 "0" from client-policy pair 0 references and is created using deduplication via data container group 102 "0 and data container group 102 "2". This illustrates a case where a backup process may not completely fill a data container group 102. In some embodiments, a mapping table is maintained to track which non-full data container group is used by which client-policy pair, so that the next process from the same client-policy pair can continue writing into the same data container group 102 until the data container group 102 is full. If there is further data, a next data container group 102 can be employed for a particular image 502 such is the case with image 502 "0". In some embodiments, the data container group location map is employed as a mapping table to track as above.

Continuing with the example of FIG. 5, an image 502 "0" from a client-policy pair 1 is performed in parallel with the image 502 "0" from the client-policy pair 0, and these two images 502 are created via differing data container groups 102. The image 502 "0" from the client-policy pair 1 is performed via the data container group 102 "4". Further images 502 can be created in parallel or series with the above images 502, via further differing data container groups 102. For example, the image 502 "0" from the client-policy pair 1 is created with deduplication via the data container group 102 "1". The image 502 "1" from the client-policy pair 1 is created with deduplication via the data container group 102 "3 and the data container group 102 "5".

FIG. 5 illustrates paralleled data storing and reference updating for individual backup jobs. As a backup image from a client-policy pair most likely shares more data with previous backup images from the same client-policy pair than with a backup image from a differing client-policy pair, two parallel backup processes from differing client-policy pairs should store data into differing data container groups 102. This practice minimizes data containers and reference databases to be updated at process transaction commit time when all open containers and reference databases related to the committing process have to be flushed to disk or other storage. This practice further reduces repeated data segments across multiple data container groups 102, thus improving storage efficiency.

Figure 6:
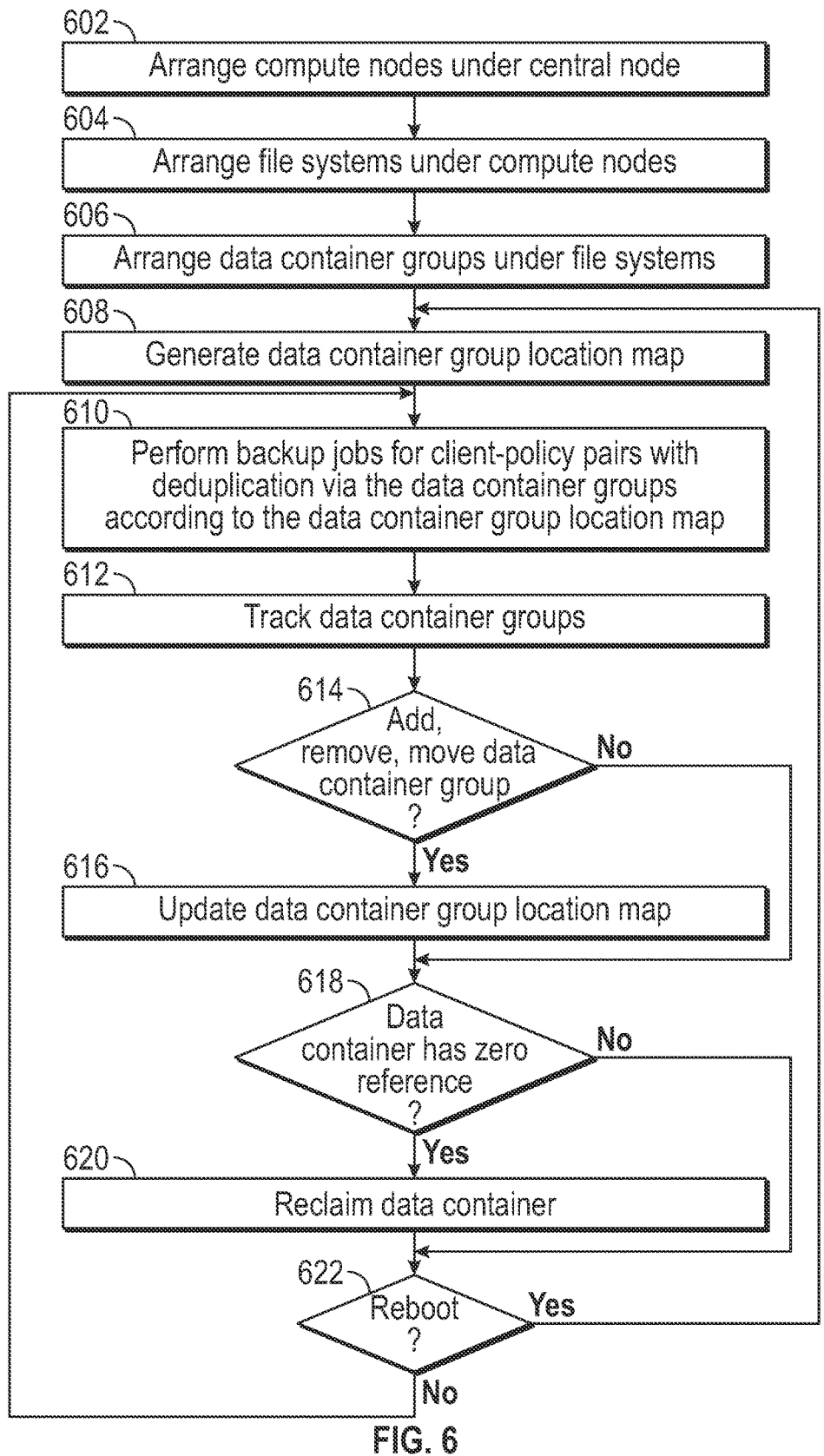
FIG. 6 is a flow diagram of a method of managing data container groups in a deduplication system in accordance with some embodiments.

FIG. 6 is a flow diagram of a method of managing data container groups in a deduplication system. The method can be practiced on or by a deduplication system, a storage system, a data container management system, or a processor, e.g., a processor of one of these systems or another system. The method can be practiced on or by embodiments shown in FIGS. 1-5. Compute nodes are arranged under a central node, in an action 602. File systems are arranged under the compute nodes, in an action 604. In some embodiments, the file systems are in or are associated with volumes. Data container groups are arranged under the file systems, in an action 606. In some embodiments, the file systems are arranged under a single compute node, and the action 602 may not be necessary.

A data container group location map is generated, in an action 608. In some embodiments, the map can be generated by mounting file systems, accessing subdirectories under the file systems, and accessing reference databases of the data container groups. Backup processes are performed for client-policy pairs, in an action 610. The backup processes have deduplication via the data container groups according to the data container group location map. The data container groups are tracked, in an action 612. The tracking can be applied to direct a subsequent backup job from a client-policy pair to a respective data container group employed for one or more previous backup jobs by the same client-policy pair.

In a decision action 614, it is determined if there is addition of a data container group, removal of a data container group or movement of a data container group. If the answer is no, no data container group is added, removed or moved, flow branches to the decision action 618. If the answer is yes, a data container group is added, removed or moved, flow continues to the action 616. In the action 616, the data container group location map is updated. In the decision action 618, it is determined if a data container has zero reference. This determination can be performed by analyzing contents of the reference databases of the data container groups. If the answer is no, there is no data container with zero reference, flow branches to the decision action 622. If the answer is yes, there is a data container with zero reference, flow proceeds to the action 620. In the action 620, the data container (with zero reference) is reclaimed. The reclaimed data container is then available for use in backup processes with deduplication.

In the decision action 622, it is determined if there is a reboot. For example, if the system crashes or is taken down for repairs, maintenance, etc., the system could be rebooted. If the answer is no, there is no reboot, flow proceeds back to the action 610, to perform further backup processes. If the answer is yes, there is a reboot, flow branches back to the action 608, in order to re-generate the data container group location map, after which the system can perform further backup processes. In variations, the decision actions 614, 618, 622 could be performed in various orders. A reboot could be performed at other times, and may be accompanied by further recovery measures.

Figure 7:
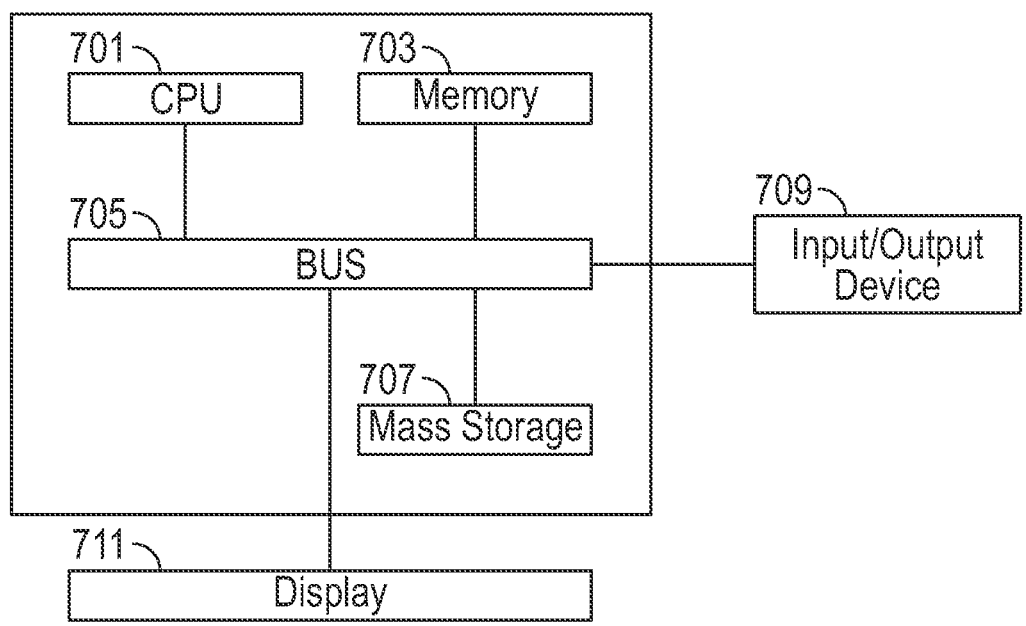
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for managing data container groups and deduplication for backup processes in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for data container group management in a deduplication system, comprising:
    arranging a plurality of data container groups according to a plurality of file systems, a subset of the plurality of data container groups corresponding to each of the plurality of file systems, each of the plurality of data container groups having a reference database, a plurality of data containers, and a data container group identifier (ID);
    performing a first backup process for a first client-policy pair with deduplication via a first one of the plurality of data container groups;
    performing a second backup process for a second client-policy pair with deduplication via a second one of the plurality of data container groups;
    moving one of the plurality of data container groups from a first one of the plurality of file systems to a second one of the plurality of file systems; and
    updating a data container group location map in accordance with the moving, wherein at least one method operation is performed by a processor.

2. The method of claim 1, wherein:
    the first backup process and the second backup process are performed in parallel;
    performing the first backup process includes updating the reference database of the first one of the plurality of data container groups; and
    performing the second backup process includes updating the reference database of the second one of the plurality of data container groups.

3. The method of claim 1, further comprising:
    building a data container group location map, based on a compute node indicating a plurality of file systems;
    adding to the data container group location map, based on each one of the plurality of file systems indicating a subset of the plurality of data container groups corresponding to the one of the plurality of file systems; and
    adding to the data container group location map, based on each one of the plurality of data container groups indicating, via the reference database of the one of the plurality of data container groups, which of a plurality of client-policy pairs correspond to the one of the plurality of data container groups having a corresponding data container group ID, wherein the data container group location map associates data sources of the plurality of client-policy pairs into the plurality of file systems and a plurality of data container group IDs, wherein the first backup process and the second backup process proceed according to the data container group location map.

4. The method of claim 1, further comprising:
    building a data container group location map, based on a central node indicating a plurality of compute nodes;

adding to the data container group location map, based on each of the plurality of compute nodes indicating a plurality of file systems;
adding to the data container group location map, based on each one of the plurality of file systems indicating a subset of the plurality of data container groups corresponding to the one of the plurality of file systems; and
adding to the data container group location map, based on each one of the plurality of data container groups indicating, via the reference database of the one of the plurality of data container groups, which of a plurality of client-policy pairs correspond to the one of the plurality of data container groups having a corresponding data container group ID, wherein the data container group location map associates data sources of client-policy pairs into the plurality of file systems and a plurality of data container group IDs, wherein performing the first backup process and performing the second backup process proceed according to the data container group location map.

5. The method of claim 1, further comprising:
tracking, via a data container group location map, which non-full one of the plurality of data container groups is used by the first client-policy pair;
performing a third backup process, for the first client-policy pair, with deduplication via the non-full one of the plurality of data container groups.

6. The method of claim 1, further comprising:
adding a data container group, corresponding to a subdirectory of one of the plurality of file systems;
naming the subdirectory with a data container group ID of the added data container group; and
updating a data container group location map, based on the adding.

7. A tangible, non-transitory, computer-readable media having instructions thereupon which, when executed by a processor, cause the processor to perform actions comprising:
performing a first backup process for a first client-policy pair with deduplication via a first one of a plurality of data container groups, wherein the first one of the plurality of data container groups is in a first subdirectory that is named with a first data container group identifier (ID) and is under a first file system;
performing a second backup process for a second client-policy pair with deduplication via a second one of a plurality of data container groups, wherein the second one of the plurality of data container groups is in a second subdirectory that is named with a second data container group ID and is under a second file system;
moving one of the plurality of data container groups from the first file system to the second file system; and
updating a data container group location map in accordance with the moving.

8. The computer-readable media of claim 7, wherein:
performing the first backup process includes updating a first reference database associated with the first data container group ID;
performing the second backup process includes updating a second reference database associated with the second data container group ID;
data storing for the first backup process and data storing for the second backup process are performed in parallel; and
updating the first reference database and updating the second reference database are performed in parallel.

9. The computer-readable media of claim 7, wherein the actions further comprise:
generating a data container group location map, based at least on the first subdirectory, a first reference database of the first one of the plurality of data container groups, the second subdirectory, and a second reference database of the second one of the plurality of data container groups.

10. The computer-readable media of claim 7, wherein the actions further comprise:
reading data from a one of the plurality of data container groups under one of a plurality of file systems;
establishing the one of the plurality of data container groups under a differing one of the plurality of file systems;
writing the data from the one of the plurality of data container groups under the one of the plurality of file systems into the established one of the plurality of data container groups under the differing one of the plurality of file systems; and
updating a data container group location map based on moving the one of the plurality of data container groups from under the one of the plurality of file systems to under the differing one of the plurality of file systems.

11. The computer-readable media of claim 7, wherein the actions further comprise:
adding a data container group to a subdirectory named for the data container group; and
adding a record to a data container group location map, based on the adding the data container group.

12. The computer-readable media of claim 7, wherein the actions further comprise:
removing a data container group from a subdirectory named for the data container group;
deleting the subdirectory named for the data container group; and
removing a record pertaining to the data container group from a data container group location map, based on the removing the data container group.

13. The computer-readable media of claim 7, wherein the actions further comprise:
determining that a reference database of a one of the plurality of data container groups has no reference to a data container in the one of the plurality of data container groups; and
reclaiming the data container, responsive to the determining.

14. A deduplication system with autonomous data container group management, comprising:
a plurality of data container groups organized under a plurality of file systems, each of the plurality of data container groups having a plurality of data containers configured to hold data from deduplication, a reference database configured to track references of each of the plurality of data containers, and a data container group identifier (ID) as a name of a subdirectory under one of the plurality of file systems; and
at least one processor, configured to perform actions including:
performing backup processes for differing client-policy pairs via differing ones of the plurality of data container groups under differing ones of the plurality of file systems;
generating a data container group location map based on the name of the subdirectory of each of the plurality of data container groups, wherein the backup processes are as mapped by the data container group location map;

moving one of the plurality of data container groups from a first one of the plurality of file systems to a second one of the plurality of file systems; and updating the data container group location map in accordance with the moving.

15. The deduplication system of claim 14, wherein the at least one processor is configured to move a one of the plurality of data container groups from one of the plurality of file systems to a differing one of the plurality of file systems by performing actions comprising:

creating a subdirectory having the data container group ID under the differing one of the plurality of file systems;

reading data from the one of the plurality of data container groups under the one of the plurality of file systems; and writing the data from the one of the plurality of data container groups under the one of the plurality of file systems to the subdirectory having the data container group ID under the differing one of the plurality of file systems.

16. The deduplication system of claim 14, further comprising:

a compute node having at least a subset of the plurality of file systems thereunder, the compute node configured to provide mount points to the at least one processor for the at least a subset of the plurality of file systems.

17. The deduplication system of claim 14, further comprising:

a central mode having a plurality of compute nodes thereunder; and each of the plurality of compute nodes having at least a subset of the plurality of file systems thereunder, each of the plurality of compute nodes configured to provide mount points to the at least one processor for the at least a subset of the plurality of file systems.

18. The deduplication system of claim 14, wherein generating the data container group location map includes:

scanning mount points provided by a compute node or each of a plurality of compute nodes;

mounting the plurality of file systems based on the scanning the mount points;

determining which of the plurality of data container groups are under which of the plurality of file systems, responsive to mounting the plurality of file systems; and determining, from a file of each of the plurality of data container groups, which of a plurality of client-policy pairs corresponds to each of the plurality of data container groups, wherein the data container group location map directs each backup process to one of the plurality of data container groups according to a client-policy pair of each backup process.

19. The deduplication system of claim 14, wherein the at least one processor is configured to reclaim container space, responsive to the at least one processor determining that there are no references in the reference database of a one of the plurality of data container groups to a one of the plurality of data containers in the one of the plurality of data container groups.

* * * * *